UNITED STATES PATENT OFFICE.

ALFRED F. BEAULIEU, OF CHICAGO, ILLINOIS.

PROCESS OF WELDING HIGH-SPEED STEEL TO OTHER STEEL OR IRON.

1,256,429. Specification of Letters Patent. Patented Feb. 12, 1918.

No Drawing. Application filed December 21, 1915. Serial No. 68,086.

*To all whom it may concern:*

Be it known that I, ALFRED F. BEAULIEU, a citizen of the United States, residing at Chicago, in the county of Cook and State of Illinois, have invented certain new and useful Improvements in Processes of Welding High-Speed Steel to other Steel or Iron, of which the following is a specification.

My invention relates to an improvement in the method of welding high-speed steel to other steel or to iron, in either case the two pieces of metal to be welded or united containing different percentages of carbon.

In the manufacture of lathe tools it has been found necessary for the sake of economy to use tools of a medium grade steel, or when high-speed steel is used, to make the cutting portion of the tool in the form of a small bar of polygonal form in cross section which is mounted and clamped in a holder in which the piece of high-speed steel may be adjustably set and may be renewed when used, thus reducing the cost, and in the manufacture of other tools such as chisels and the like, or in making horseshoes and placing the calks thereon, it has likewise heretofore been impractical to construct the main body of the part being manufactured of a metal bearing one percentage of carbon and to weld or otherwise permanently secure and unite a high-speed steel tip or edge therewith. With these facts in mind, it is an object of my invention to provide a method by which high-speed steel may be welded and united with cold rolled steel, tool steel, other steel or iron by the use of the oxy-acetylene process.

A further object lies in the provision of a compound or mixture which may be used as a flux in which the filling rod or wire may be dipped at intervals during the welding process, and which will act to prevent oxidation of the metal of the pieces being welded or of the filler, and with which the filler is caused to amalgamate with both pieces of the metal being welded on the allied ends thereof, and which will thus practically obliterate the identity of each piece of metal at the allied face as well as the identity of the filler, and will cause the several metals to combine in an amalgam which will be perhaps substantially homogeneous throughout its central section while merging gradually into the properties of the metal of each of the pieces and thus form a connection which will avoid the comparatively sharp line of demarcation between the two pieces of metal which is usually attended upon prior endeavors to weld high-speed steel with other metals bearing a varied percentage of carbon.

In carrying out a welding operation in accordance with my process, the pieces of metal to be united may be chipped or otherwise cut away to provide the V-shaped formation usually resorted to in oxy-acetylene welding, or the parts may be left in their original physical identity. As in the usual method of oxy-acetylene welding, the only purpose of the preliminary preparation of the parts by chipping or cutting away is to permit the flame to be more readily directed into the space between the allied faces of the two pieces of metal and while it may be found advantageous to cut away or chip away when rods or bars are being welded, on the other hand this may be found impractical as in the welding of calks to the under side of a horseshoe.

With the use of my process I have found that Norway or Swedish iron is perhaps the best filler and in the execution of a weld, a rod, or wire of this metal is introduced in the opening at the time both pieces of metal are about or at the melting point and the direction of the flame thereagainst and against the two pieces of metal causes the same to be melted and the filler amalgamates with both pieces of metal. The filling rod or wire is kept in the flame until the cut or chipped away opening is completely filled or until sufficient of the filler metal has been run into the space between the allied ends and amalgamated therewith to accomplish a complete union of the parts.

To initiate the amalgamating effect and to complete the homogenizing of the three metals of various properties at the joint, it is necessary to introduce a flux which will be carried in comparatively small quantities but which must necessarily spread to all parts of the joint. After an exhaustive research I have found that a flux consisting of the hereinafter listed ingredients and in the proportions named will operate to cause amalgamation of the metals at the joint and will at the same time overcome the tendency to oxidization.

| Bicarbonate of soda | 40% |
|---|---|
| Carbonate of soda | 40% |
| Sodium borate | 10% |
| Precipitated silica | 5% |
| Lithium carbonate | 5% |
| | 100% |

This flux may be combined by taking the ingredients in powdered form and subjecting the same to a mechanical mixing action, or if the occasion demands, they may be mixed with some sort of a binding material which will bring them to a semi-fluid or pasty consistency or perhaps even to a liquid form, the manner of combining and using the compound of course depending somewhat upon the specific welding operation. Past experiments have shown that the flux has proved very efficient when used by dipping the filling rod from time to time during the welding operation into the compound in a powdered form, the heat causing the flux to adhere thereto and to be introduced in just sufficient quantities to overcome oxidization.

To briefly reiterate the operation of the process, as the allied faces of the pieces to be united are brought to and held in the proper position, the flame is applied to bring the metal of each of the pieces to the melting point and while the metal is maintained in the molten state the metal from the filling rod, which may be either Norway or Swedish iron, or perhaps a metal having other various properties, is flowed into the molten metal and mixed with it to cause an amalgamation of the metals of the varied properties and will at the same time serve to fill in any crevices or openings which may have been purposely, or otherwise left between the allied faces and will relieve the tendency of the weld to present a more or less sharp differentiation of metallic properties by merging the metal of the filling rod gradually and amalgamating the same into the metal of each of the pieces.

From the foregoing it will be seen that I have provided a process by which high-speed steel may be welded to and permanently united with various steels or to iron by the use of the oxy-acetylene process and with which the metal of the two members being united is amalgamated with the metal of a filler introduced between the allied faces and is merged gradually from the one piece into the filler metal and out to the second piece of the original material, and further that a flux is provided which will form a perfect weld and which will prevent oxidization or burning of the metal through the use of the oxy-acetylene torch.

It will be obvious to those skilled in the art that variations in the process may be resorted to and perhaps also in the flux used may be resorted to without departing from the spirit and scope of my invention, and hence it is my desire to be limited only to those points which may be set forth in the claims.

I claim:—

1. That improvement in fluxes to be used in the process of welding metals containing varied percentage of carbon consisting of relatively large quantities of bicarbonate of soda and carbonate of soda, and relatively small quantities of sodium borate, precipitated silica, and lithium carbonate.

2. That improvement in fluxes for use in the process of welding metals containing varied percentage of carbon which consists of:

| Bicarbonate of soda | 40% |
|---|---|
| Carbonate of soda | 40% |
| Sodium borate | 10% |
| Precipitated silica | 5% |
| Lithium carbonate | 5% |
| | 100% |

In testimony whereof I affix my signature in presence of two witnesses.

ALFRED F. BEAULIEU.

Witnesses:
 ADOLPH KRAUSS,
 RECHA KRAUSS.